(12) United States Patent
Klose (10) Patent No.: US 7,497,587 B2
(45) Date of Patent: Mar. 3, 2009

(54) LAMP

(75) Inventor: Leonhard Klose, Lüdenscheid (DE)

(73) Assignee: Erco GmbH, Ludenscheid (DE)

( * ) Notice: Subject to any disclaimer, the term of this patent is extended or adjusted under 35 U.S.C. 154(b) by 0 days.

(21) Appl. No.: 11/505,257

(22) Filed: Aug. 16, 2006

(65) Prior Publication Data

US 2007/0103894 A1 May 10, 2007

(51) Int. Cl.
*F21V 7/04* (2006.01)

(52) U.S. Cl. ............... 362/147; 362/249; 362/231; 362/298; 362/300

(58) Field of Classification Search ........ 362/145, 362/147, 297, 298, 299, 300, 301, 307, 231, 362/364, 365, 346, 294, 373, 249, 252, 800
See application file for complete search history.

(56) References Cited

U.S. PATENT DOCUMENTS

| | | | |
|---|---|---|---|
| 5,285,356 A | 2/1994 | Skene et al. | |
| 6,149,283 A | 11/2000 | Conway et al. | |
| 6,491,412 B1 * | 12/2002 | Bowman et al. | 362/249 |
| 6,682,211 B2 * | 1/2004 | English et al. | 362/545 |
| 6,759,814 B2 * | 7/2004 | Vogel et al. | 315/312 |
| 6,848,820 B2 * | 2/2005 | Natsume | 362/545 |
| 6,995,355 B2 * | 2/2006 | Rains et al. | 250/228 |
| 2004/0156213 A1 * | 8/2004 | Lodhie | 362/555 |
| 2005/0207147 A1 | 9/2005 | Sinha | |
| 2007/0263379 A1 * | 11/2007 | Dowling | 362/151 |
| 2007/0274096 A1 * | 11/2007 | Chew et al. | 362/609 |

FOREIGN PATENT DOCUMENTS

| | | |
|---|---|---|
| DE | 296 20 583 | 2/1997 |
| DE | 196 32 665 | 8/1997 |
| DE | 200 07 134 | 8/2000 |
| EP | 0 545 474 | 6/1993 |
| EP | 1 092 919 | 4/2001 |
| EP | 1 557 604 | 7/2005 |
| WO | WO 2005/105381 | 11/2005 |

* cited by examiner

*Primary Examiner*—Thomas M Sember
(74) *Attorney, Agent, or Firm*—Andrew Wilford (57) ABSTRACT

A light fixture for fixing to a building or building surface has a trough-shaped reflector having first and second side walls forming a light outlet and a reflective inner surface, each of the side walls having a planar section. A diffuser is mounted on the outlet. A plurality of LED's of different colors on the planar sections are positioned such that a predominant portion of the light emitted by the LED's on one of the side walls only reaches the diffuser element after reflection off the other side wall.

21 Claims, 4 Drawing Sheets

LAMP

This invention relates to a light fixture according to the preamble of claim 1.

In particular, it concerns a building light fixture that, for example, can be mounted on the ceiling of a room. Similarly, the light fixture also may be an outdoor light fixture. Preferably, the light fixture serves to illuminate areas of the building. Basically, it is desirable to achieve a homogenous distribution of light, and, in the case of light fixtures of varying color, to achieve, if possible, a homogenous color mixing.

A light fixture of the applicant, which obviously became known through prior use, comprises a generally trough-shaped reflector with a reflecting inside face. The applicant's light fixtures, which became known under the name "focal flood," have three fluorescent lamps of different colors inside the reflector that may be selected for the purpose of realizing different mixed colors. The one-piece trough-shaped reflector has two side walls and a floor wall, in the walls being oriented in such a way that overall this essentially produces a parabolic cross-section. The top of the reflector forms the floor of the reflector. Furthermore, two narrow side walls are provided at the end of the reflector. A diffuser element is provided in the light outlet, and mixes the light components of the basic colors of the three light sources.

On the basis of the known light fixture, it is the object of the present invention to provide a light fixture by using LED's (light emitting diodes) as a light source, which largely prevents the structures of the individual light sources from melting and, by providing a compact style, offers the option of a simple assembly.

The invention achieves this object with the features of claim 1, especially with the features of the charactering clause and, accordingly, is characterized in that at least the first side wall and the second side wall located opposite the first side wall, have at least a section aligned along a plane on which several LED's are provided, the light fixture having LED's of varying colors, and the LED's being provided in such a way that the predominant portion of the light emitted by the LED provided on one side wall, reaches the diffuser element only after reflection off another side wall.

The principle of the invention initially consists in providing side wall sections of the reflector that are oriented flat or two-dimensionally, that is, along one plane. The sections enable a particularly simple fixing of the LED's that, for example, can be supported by a printed-circuit board on the reflector. By a particularly simple method, lying flat, the printed-circuit board may be fixed on the planar section, so that a simple and secure mounting is possible with simple fixing means. Mounting the printed-circuit board as flush as possible in the planar section thus enables the stable mounting of the printed-circuit board on the reflector element. The provision of a planar section makes it possible to provide for a large positioning surface for the printed-circuit board.

For example, the LED's may project through openings in the section into the inside area of the reflector, while the printed-circuit board on an outside face of the section lies flat against the reflector. By mounting the printed-circuit board outside the interior of the reflector, the printed-circuit board is unable to influence the distribution of light and the transmission of light within the reflector.

The flat design of a section of a side wall of the reflector, apart from fixing flat printed-circuit boards with LED's and the simple mounting of the printed-circuit boards, also enables the simple fixing of a heat sink to the outside of the printed-circuit board, so that the cooling element does not influence the mixing of light and the transmission of light inside the reflector. The cooling element or the heat sink thus may also be designed in an advantageous manner, in that it is flat or voluminous, securely mounted, and stable on the reflector housing, directly on or above the printed-circuit board.

Another major aspect of the invention is that at least on the first side wall and at least on the second side wall of the reflector located opposite the side wall, LED's are provided on the walls. In principle, this produces at least one array of LED's in the reflector, the array being distributed around the interior of the reflector, which means that the LED's are spaced at a distance from one another. Furthermore, it is provided that the predominant portion of the light emitted by the LED reaches the diffuser element only after reflection off another side wall, especially only after reflection off the side wall located opposite the side wall on which the LED is fixed. This ensures that in any case only a small portion of the light emitted by the LED's reaches the diffuser element directly. Preferably, this is the case when the dominant portion of the light emitted by the LED is reflected off the opposite side wall, there is the possibility that this portion of light impinges on a planar inside surface, so that at the point a reflection occurs which can be predetermined particularly well.

Overall, the inventive embodiment enables the reflector element and the orientation of the LED's to create a particularly good color mixing of varying colors of light. Even before all the light emitted by all LED's impinges on the diffuser element, a thorough color mixing already has occurred. The mixing is improved even further by the diffuser element.

A viewer outside the light fixture, when viewing the diffuser element directly, is unable to differentiate the individual light sources in terms of their configuration and in terms of their color. Similarly, a building surface illuminated by this light fixture is homogeneously illuminated in terms of the light fixture's intensity and in terms of its mixing color.

The inventive light fixture furthermore allows highly efficient operation, since the occurrence of loss of electric power is extremely negligible. The inventive light fixture is able to achieve a sufficiently homogeneous mixing of color with a relatively low number of reflections. The predominant portion of the light emitted by an LED impinges on the diffuser element following a single reflection off a side wall. However, it cannot be excluded that some components of the light emitted by an LED reach the diffuser element only after a multiple reflection on several side walls or possibly also on the floor. In order to achieve a high luminous efficiency, an excessively high number of reflections, however, is considered to be a disadvantage, and can be prevented with the light fixture according to the invention.

The light fixture according to the invention makes for a very compact space-saving design with particularly homogeneous color mixing and simple style.

The trough-shaped reflector within the meaning of the present patent application in particular is an elongated reflector comprising a greater longitudinal dimension than a transverse dimension. With this design, the wording "trough-shaped reflector," however, is not limited within the meaning of the present patent application. This term also refers to those reflectors whose longitudinal dimensions are approximately the same as their transverse dimensions.

The trough-shaped reflector element has a light outlet in which a diffuser element is provided. In particular, in the case of the light fixture being designed as an orientation light fixture, decorative light fixture, or emergency light fixture, the reflector element is a severely diffused diffuser element which is lighted from the back and practically radiates light, for example, to illuminate a notice graphic. In this case, the light outlet of the trough-shaped reflector element also constitutes the light outlet of the light fixture.

With all other light fixtures, for example, with wall or ceiling washers, within the path of light behind the light outlet of the trough-shaped reflector and/or within the path of light behind the diffuser element, may be provided, another additional reflector element, for example, a reflector configuration referred to as a light shovel. This enables the transmission or control of a light that, in terms of color and luminous intensity, has been mixed optimally.

According to a preferred embodiment of the invention, a printed-circuit board that carries several LED's is mounted on an outside face of the section. This enables a particularly simple assembly, because several LED's can be fixed to the reflector element simultaneously, that is, during a single assembly phase. Furthermore, conventional components can be used, since the flat design of the fixing section by all means allows conventional fasteners to be used. Ultimately, typical conventional two-dimensional printed-circuit boards may also be used.

According to another preferred embodiment of the invention, the printed-circuit board is fixed to the section by means of screws and/or detents. This enables a particularly construction method in which one is able to fall back on conventional fasteners.

According to another preferred embodiment of the invention, the LED's project from the printed-circuit board into an interior of the reflector. This enables a particularly advantageous light transmission and mixing of the light emitted by the LED's within the reflector element, and a particularly simple fixing of the printed-circuit board and possibly of the cooling elements. Furthermore, the cooling elements and printed-circuit board do not influence the transmission of light within the reflector element.

According to another preferred embodiment of the invention, openings are provided in the section. This enables the LED's to pass through or alternately for the light emitted by the LED's to pass through. In the latter case, the LED's may also be provided outside the interior of the reflector, for example, immediately adjacent the openings.

Preferably, the LED's at least in part project through the openings and thus into the interior of the reflector element.

Furthermore, it is preferable if a heat sink is provided on an outside face of the printed-circuit board. This enables the use of conventional components in which the components are mounted within the reflector element outside the reflector, without an interfering influence on the transmission of light.

According to another preferred embodiment of the invention, at least one printed-circuit board is provided on which at least six LED's are spaced apart from one another. This enables a particularly preferred homogeneous distribution of light, as a certain differentiation of the structure of the sources of light can be achieved by the orientation of the LED's that are spaced along the interior of the reflector elements. Furthermore, the spaced orientation may preferably be such that the LED's are distributed evenly over the area of the printed-circuit board.

Furthermore, it is preferable that the dimension of the printed-circuit board essentially corresponds to a large section of the area and/or also preferably to a large section of the area of the side wall. Consequently, this enables a particularly even distribution of the array of the LED's across the entire interior of the reflector, which ensures a further improved homogenous color mixing.

According to a further preferred embodiment of the invention, at least one printed-circuit board is provided on which at least two red, two blue, and two green LED's are spaced apart from one another. This enables a further preferred homogeneous color mixing with simple design, in which one is able to fall back on conventional printed-circuit boards.

According to a further preferred embodiment of the invention, the reflector has four side walls and particularly one floor. This enables a particularly simple design of the reflector element consisting of five components, in which each component may consist of a disk-shaped body. Another preferred embodiment is that the two side walls, especially both side walls, possibly also the floor, extend along a plane. This makes it possible to provide a particularly simple design and enables a particularly good predetermination from the distribution of light of the light fixture.

According to a further preferred embodiment of the invention, the LED's are individually controllable in order to achieve a changeable mixing color of the light fixtures individually or as a group. Typically, the light fixtures are connected to a central controller from which the fixture is able to receive control signals, for example, according to the DALI protocol. Individual LED's are selectable in terms of their intensity and generate different mixing colors of the light fixture.

According to another preferred embodiment of the invention, the trough-shaped reflector flares toward the light outlet exit. This enables a particularly good transmission of the overall flow of light from the LED's to the light outlet with a very small number of reflections, so that overall a high degree of light efficiency, that is, luminous efficiency, can be realized.

According to another preferred embodiment of the invention, the reflector element is generally of trapezoidal cross section. This enables a particularly simple design and a particularly good color mixing of the various colors emitted by the LED's.

According to another preferred embodiment of the invention, the reflector element is generally of triangular cross section. Such a cross-section enables a simple design.

According to another preferred embodiment of the invention, the reflector element is of a generally rectangular cross-section. Such a cross-section enables a particularly simple design of the light fixture.

According to another preferred embodiment of the invention, a second reflector element is provided in the path of light behind the diffuser element and/or in the path of the light behind the light outlet of the trough-shaped reflector. This embodiment enables one, in a particularly advantageous manner, to provide a light fixture that, for example, is designed as a wall washer or ceiling washer that transmits the light that is optimally mixed in the trough-shaped reflector in terms of color and distribution of light, and thus is able to cast this light, for example, on a surface of the building. This embodiment, for example, enables the construction of a compact light fixture with a high degree of non-glare.

Other advantages of the invention are revealed in the uncited sub-claims and by means of the following description of the embodiments presented in the drawings. In the drawings:

Figure 1:
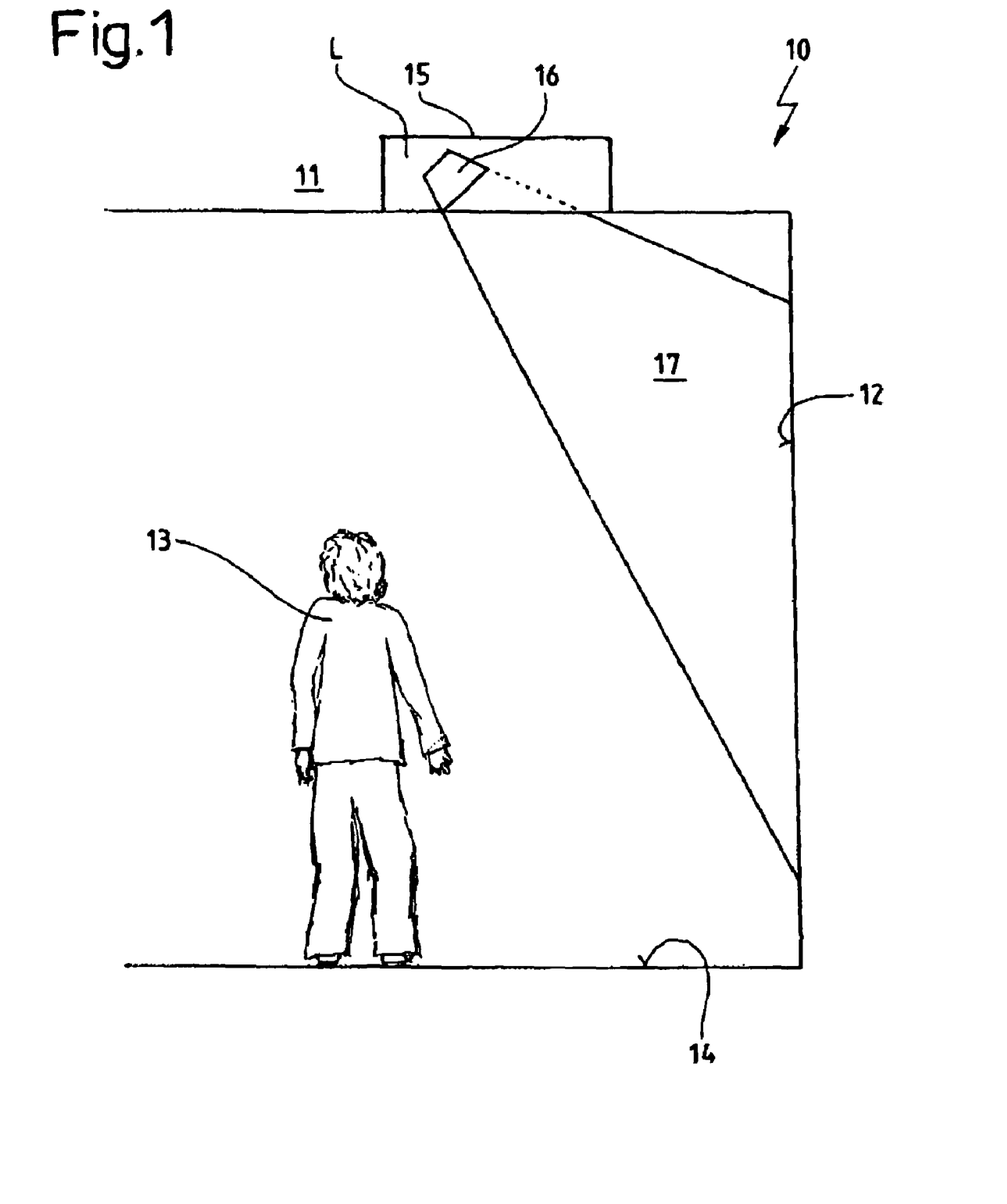
FIG. 1 is a diagrammatic presentation of a room of a building with an embodiment of a light fixture according to the invention provided on a ceiling of the room and illuminating a side wall of the room.

The light fixture according to FIG. 1, which in all the figures is designated as 10, is provided on a ceiling 11 of a building. It serves to illuminate the wall surface 12, but similarly may be used in a manner not shown in the drawings for illuminating a floor surface 14 or an item which is not shown or an outdoor surface. The person 13 shown in the drawing illustrates the layout of the room.

According to FIG. 1, the light fixture only has a diagrammatically shown housing of the light fixture 15 with an interior of the light fixture L in which a reflector element 16 is provided, which hereinafter is described in detail. In FIG. 1, the light fixture 15 is shown only in the form of a diagrammatic sketch and can, for example, also be provided with a glass cover (not shown) in the light outlet of the light fixture. Similarly, the housing 15 of the lamp, which is not shown in the drawing, may be very similar or adapted to the shape of the reflector element 16. The dimensions of the housing 15 of the light fixture 10 must not considerably exceed the dimensions of the reflector element 16. Overall, this enables the provision of a very compact design of the light fixture 10. On the other hand, FIG. 1 shows a light fixture housing 15 whose dimensions are considerably greater than those of the reflector element 16.

Preferably inside the light fixture L, but outside the reflector 16, connections are provided, such as operating devices for the light source, for example, transformers or control devices, and connecting lines, etc. The light fixture may be connected via a signal line with a control unit, which is not shown, and, of course, is connected with voltage supply lines.

According to the invention, inside the lamp 15 are various colored light sources in the form of LED's. The light fixture 10 is intended to transmit a homogenous light in terms of its intensity and color mixing, so that the wall surface 12 in the area of the cone of light 17 is illuminated as homogeneously as possible. Similarly, it is the object of the invention that the user 13, when looking at the light fixture 15 from various viewing angles is unable to differentiate the light sources contained therein.

Figure 2:
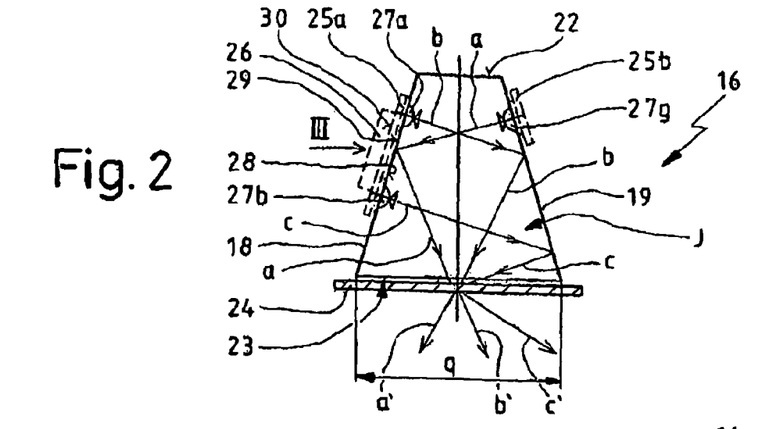
FIG. 2 is a detailed presentation of a schematic, sectional view of the reflector element of the first embodiment of the light fixture shown in FIG. 1 with a generally trapezoidal reflector element.

FIG. 2 shows in a detailed highly diagrammatic view in a partial cross-section a first embodiment of an inventive reflector element 16 of the light fixture 10. The reflector element 16 is generally trough-shaped and is trapezoidal in cross-section and in longitudinal section, and, as shown, in FIG. 4, has a maximum longitudinal dimension l, and a maximum transverse dimension q in the area of a light outlet 23 of the reflector 16. The actual light outlet 23 thus has an area equal to l×q.

The reflector element 16 has a first side wall 18 and a second side wall 19 located opposite the wall. The two side walls 18 and 19 are interconnected via a third side wall 20 and a fourth side wall 21. The respective upper areas of the four side walls, 18, 19, 20, 21, are interconnected via a floor 22.

Figure 3:
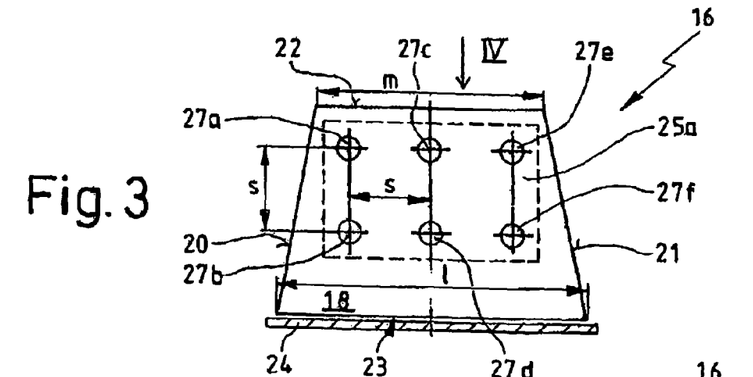
FIG. 3 is the embodiment of FIG. 2 in a sectional view according to arrow III in FIG. 2.
Figure 4:
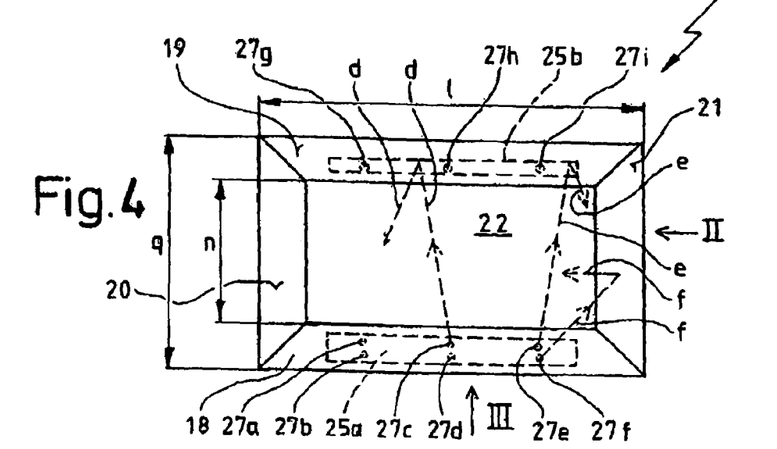
FIG. 4 is the embodiment of FIG. 2 in top view according to arrow IV in FIG. 3, the diffuser having been omitted for the sake of clarity of view.

When analyzing the sectional views in the embodiment of FIGS. 2 and 4 a generally trapezoidal basic shape is shown in the cross section according to FIG. 2 and in the longitudinal section according to FIG. 3. The interior J of the reflector element 16 thus flares conically from the base plate 22 toward the light outlet 23.

In the area of the light outlet 23 of the reflector element 16, a diffuser element 24 is provided that can be formed by a conventional, disk-shaped element, for example, in the form of a frosted, for example, sand-blasted glass body, a film or the like.

At the first side wall 18 of the reflector element 16, a printed-circuit board 25a is provided, an inside face 28 of which rests against an outside face 29 of the first side wall 18 or at least is aligned along it. Since the first side wall 18 is provided along a plane and therefore, forms a two-dimensional and disk-shaped body, the printed-circuit board 25a also may be two-dimensional, that is, be essentially flat. The printed-circuit board 25a is fixed to the first side wall 18, for example, by means of screw elements not shown in FIG. 2, or alternatively by clip elements, corresponding detents or the like.

As shown best in FIGS. 3 and 4, a total of six LED's 27a, 27b, 27c, 27d, 27e, and 27f is fixed to the printed-circuit board 25a. The LED's, for example, may be so-called side-emitting LED's or even so-called Lambert LED's. These two types of LED's basically differ in terms of their radiation characteristics and are sufficiently known from the prior art.

The LED's are typically soldered onto the printed-circuit board and supplied with operating voltage via the printed-circuit board. For this purpose, the printed-circuit board has corresponding conductor traces, possibly also electronic components, of which no further details will be provided as to the selection and the connection means for selecting the LED's.

It will be noted, however, that the side 30 of the printed-circuit board 25a that faces away from the interior J, is provided with a heat sink that is able to dissipate the heat generated by the LED's during operation. The heat sink 26 essentially may be designed in the form of a block or a rectangle, and possibly even disk-shaped, and thus is able to provide a large surface necessary for cooling.

The diagrammatic presentation according to FIG. 3 shows that the individual LED's 27a, 27b, 27c, 27d, 27e, and 27f are located at a spacing s from one another. Therefore, the LED's 27a, 27b, 27c, 27d, 27e, and 27f are arrayed in a grid-like manner along the first side wall 18, so that the LED's create a certain, relatively uniform distribution of light. The LED's 27a, 27b, 27c, 27d, 27e, and 27f, as is shown in FIG. 3, essentially are distributed uniformly across the area of the side wall 18.

In the first side wall 18, six openings, which are not shown, are provided through which the LED's 27a, 27b, 27c, 27d, 27e, and 27f project, and, as is shown diagrammatically in FIG. 2, extend into the interior J.

Depending on the type of LED selected, for example, side-emitting LED's or Lambert LED's, these LED's emit varying distributions of light. Both types of LED's may be used. The path of light within the reflector 16 will be described subsequently.

First of all, it will be noted that a printed-circuit board 25b, which in FIG. 2 only is indicated diagrammatically, is provided on the opposite second side wall 19 on which three LED's 27g, 27h, and 27i are fixed (refer to FIG. 4). Similarly, a heat sink can be provided for the printed-circuit board 25b that, however, is not shown in FIG. 2. The second side wall 19 also is oriented on a plane.

In the embodiment of FIGS. 2 and 4 the first wall 18 has a printed-circuit board 25 with six LED's and on the second wall 19 a printed-circuit board 25b with three LED's. Similarly, a larger printed-circuit board, also comprising more than six LED's, can be provided on the second side wall 19. Further, on the first side wall 18, instead of a large printed-circuit board with six LED's, a smaller printed-circuit board with only three LED's can be provided.

Preferably, the planar sections of the side walls 18 and 19 can be populated with LED's in order to achieve a compact design of the reflector element 16, so that the LED's are evenly distributed across the area of the side walls 18 and 19. Correspondingly, printed-circuit boards will be used predominantly that have dimensions like the dimensions of the respective side walls, and, if possible fill a large section of the area of the side wall.

Instead of a large-area printed-circuit board, such as printed-circuit board 25a on the side wall 18, several smaller printed-circuit boards can be mounted next to one another and similarly have dimensions that total essentially to the dimensions of the side wall or at least the section of the side wall.

At this point, it will be noted that the inside faces of these side walls 18, 19, 20, 21 and the floor 22 of the reflector 16 are designed in accordance with FIGS. 1 to 3 to be reflecting, preferably highly reflecting.

In the following the preferred color mixing of the light emitted by the LED's will be explained by means of FIG. 2:

According to FIG. 2, the LED 27a, for example, emits a ray of light b that is reflected off the second wall 19, and subsequently impinges on the diffuser 24.

The LED 27b emits a ray of light c that also is reflected off the second side wall 19, and subsequently impinges on the diffuser 24.

The LED 27g emits a corresponding ray of light a that is reflected off the side wall 18 before impinging on the diffuser element.

Irrespective of whether Lambert LED's or side-emitting LED's are used, the three beams of light, a, b, c, which are shown in FIG. 2, are representative. The predominant share of the light emitted by the LED 27g is reflected by the first side wall 18 before it impinges on the diffuser element 24. Similarly, the predominant share of the light emitted by the LED 27a and the light emitted by the LED 28b are reflected off the second side wall 19.

Color-mixed light thus impinges on the diffuser element 24. The diffuser element is able to further mix the light, as indicated by the arrows a', b', and c'.

As is shown in FIG. 4, the predominant share of the light emitted by the LED's is reflected off the opposite side walls. This is achieved by aligning the LED's and the side walls 18 and 19. In the case of an LED (e.g., LED 27e) provided at the lateral edge of the printed-circuit board 25a, for example, a light component, as indicated by the ray of light e, can be reflected off the opposite wall 19 before the ray emerges through the diffuser element 24. On the other hand, another light component of this LED 27e, as indicated by the ray of light f, can be reflected off a narrower side wall 21 of the reflector 16, before the ray emerges through the rear diffuser element 24 in the direction of viewing of the viewer of FIG. 4. The arrows d, e and f indicating the path of light, as shown in FIG. 4, end at those points at which the light emerges through the diffuser element 24 from the interior J of the reflector element 16.

Because the predominant share of all rays of light initially at least are reflected off a side wall before the rays impinge on the diffuser element, the total light reaching the diffuser element 24 is already color-mixed. The diffuser element 24 can improve the color mixing even further.

It will be noted that the maximum transverse dimension q of the reflector element 16, for example, may be between 20 mm and 150 mm, preferably in the order of magnitude of 50 mm, and that the longitudinal dimension 1 of the reflector element 16 may range between 30 mm and 150 mm, preferably in the order of magnitude of 75 mm. Similarly, the floor 22 may have a longitudinal dimension m ranging between 30 mm and 90 mm, preferably in the order of magnitude of 55 mm, and a transverse dimension n, for example, in the order of magnitude of 10 mm to 50 mm, preferably about 21 mm.

It will be noted that the shown configuration of the printed-circuit boards 25a and 25b, as well as the corresponding design of the related side walls 18 and 19 will be taken as an example only. It is of vital importance that two opposite side walls 18 and 19 be provided that have at least one planar section on which one printed-circuit board with LED's can be fixed. Preferably, as shown in the embodiments, all the side walls 18, 19, 20, 21 will be planar, that is, two-dimensional.

Furthermore, the specified number of LED's on a printed-circuit board will be taken as an example only. Preferably, between 6 and 30 LED's are provided in a trough-shaped reflector 16. The number of LED's, their orientation, which LED is allocated to which color at which location and how far apart the LED's are spaced from one another, however, will depend on the intended purpose, the overall size of the reflector 16 and the desired flow of light.

Figure 5:
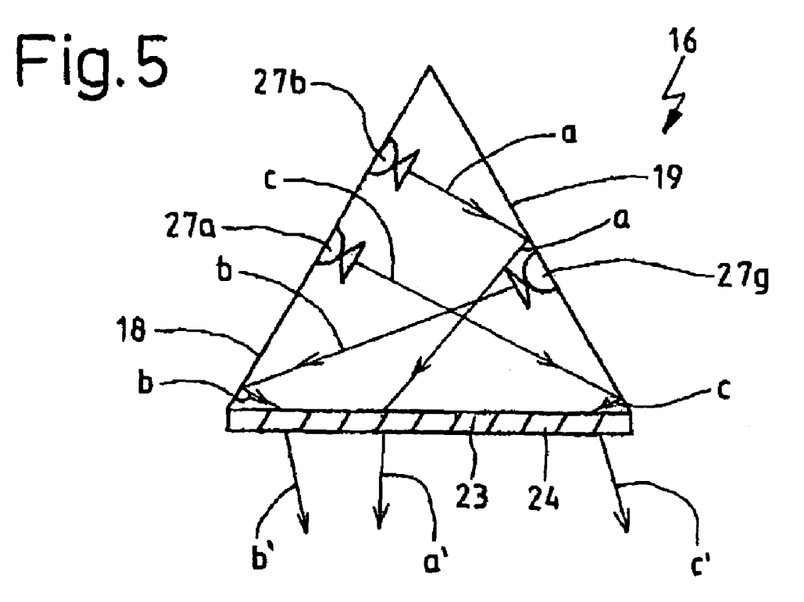
FIG. 5 is a second embodiment of a light fixture according to the invention with a reflector element with a triangular cross-section as shown in FIG. 2.

The embodiment of FIG. 5 in a view analogous to FIG. 2, has a generally triangular reflector 16 with a comparable orientation of LED's. The printed-circuit board and the heat sink are not shown. Color mixing of the light emitted by the LED's 27a, 27b, and 27g is effected in a comparable manner, similar to the above-described embodiment.

The embodiment of FIG. 5 eliminates the need for a floor 22 as shown in FIG. 2. If a floor is provided, the floor 22 also contributes to the reflection and flow of light toward the light outlet 23 of the reflector element 16.

Figure 6:
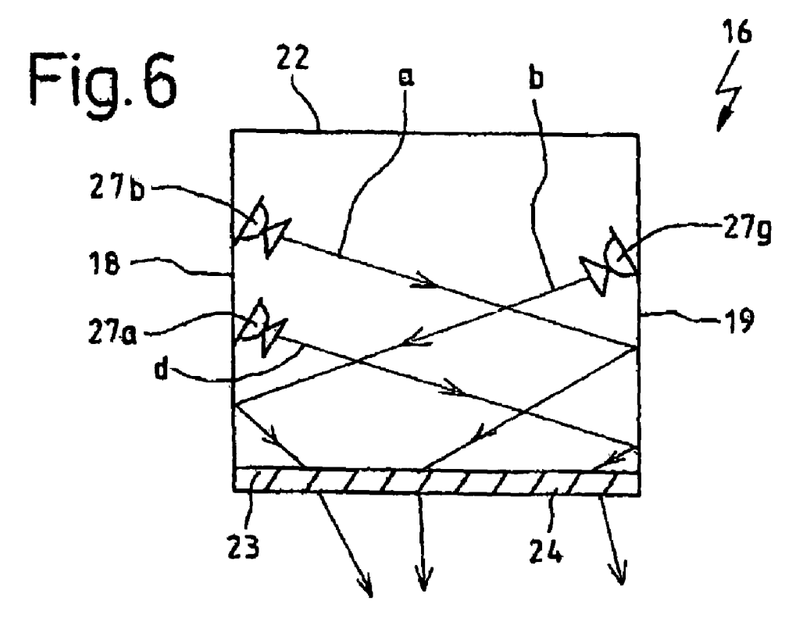
FIG. 6 is a third embodiment of a light fixture according to the invention as shown in FIG. 2 with a reflector element with a generally rectangular cross-section.

A third embodiment according to FIG. 6 has a reflector 16 of a generally rectangular cross-section. In this case, the LED's 27a, 27b, and 27g, of the side wall 16 and/or 19, are at a slight angle, here the angle shown exaggerated. Similarly, the LED's 27a and 27b can be provided jointly on a printed-circuit board, not shown, which may be oriented offset to achieve the desired configuration of the LED's, as shown in FIG. 6. Alternatively, the LED's 27a and 27b may also be allocated to different printed-circuit boards. Ultimately, it is possible to arrange the LED's at a slight angle, the LED's not being related to the printed-circuit board shown in FIG. 6, so that the printed-circuit board in relation to the respective side wall 18 and/or 19 can be fixed flat to the wall. This again facilitates fixing the printed-circuit board to the side wall.

It will be noted that the size of the LED's shown in the figures is exaggerated, and that LED's typically have smaller dimensions, that the LED's themselves do not influence the color mixing of the light, and especially do not create shadows.

The openings located in the side walls 18 and 19, through which the LED's 27a, 27b, 27c, 27d, 27e, 27f, 27g that are fixed to the corresponding printed-circuit board 25a, 25b penetrate and project into the interior J of the reflector 16, are not shown in the drawings. From FIG. 3 however it is obvious that the openings are located in the corresponding side wall on which the LED's are provided.

As indicated above, the relevant side walls 18 and 19 on which the LED's are fixed are completely planar and thus form the planar section in accordance with the invention.

With other reflector shapes that are not shown, the side walls 18 and 19 do have to be completely planar, but also may have bends or curves, and merely have a planar section where the printed-circuit board is mounted.

In an embodiment that is not shown the narrow or end walls 20 and 21 can be fitted with LED's. Preferably, because of their larger area, the LED's are provided on the side walls 18 and 19.

Figure 7:
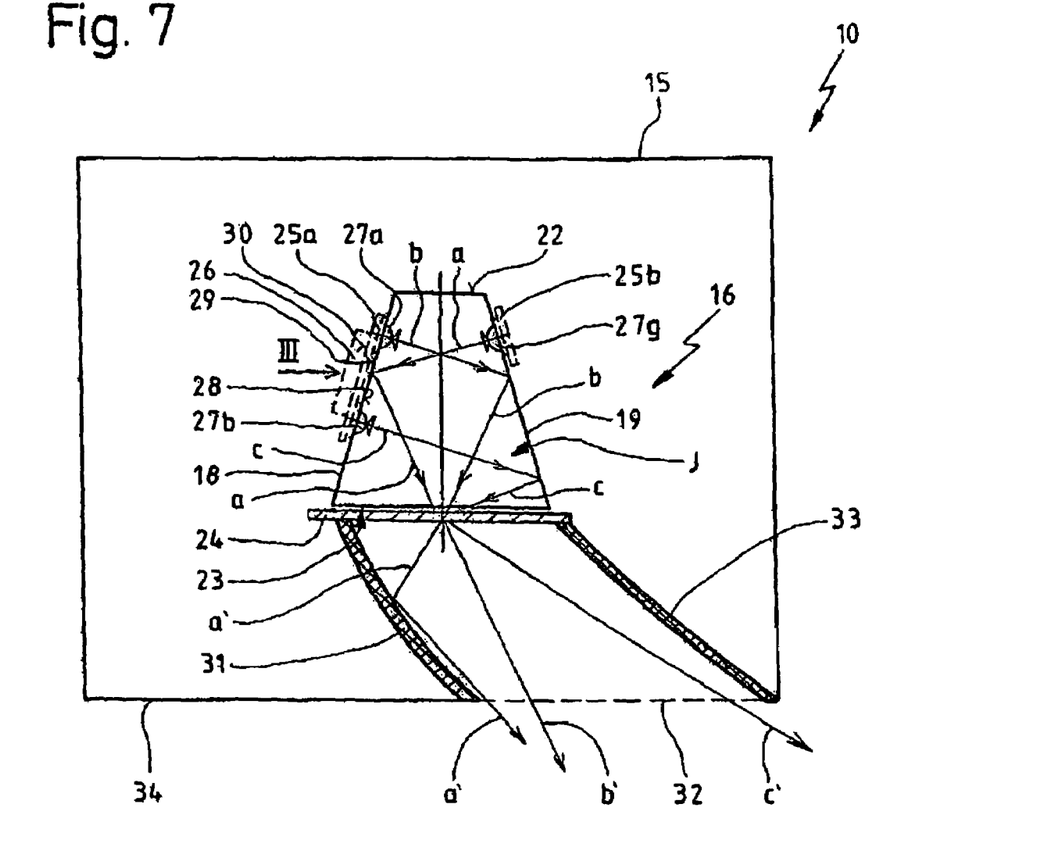
FIG. 7 is a fourth embodiment of a light fixture according to the invention as shown in FIG. 2 with a second reflector element provided in the path of light behind the light outlet of the trough-shaped reflector element.

Another embodiment of an inventive light fixture 10 will now be described with reference to FIG. 7. FIG. 7 shows a light fixture 10 with a light fixture housing 15 inside which is provided the reflector element as shown in FIG. 2, which in this case a secondary reflector element or a second reflector element 31 is located in the path of light behind the light outlet 23 of the reflector element 16. The second reflector element 31 is generally in the form of a diffuser, which means the element is arched or curved and serves to cast light emitted by the LED's mainly toward the wall of the building 12 (refer to FIG. 1), which is not shown in FIG. 7. The second reflector element 31 is directly connected to the reflector element 16 or the diffuser element 24 and can end, for example, at a light opening 32 of the light fixture 10. Additional reflector elements, like the reflector element 33 shown in FIG. 7, may be provided as well. The reflector elements 31 and 33 can be permanently fixed to the housing of the light fixture 15 and form a structure for supporting the reflector element 16.

When analyzing FIG. 7, it becomes obvious that only one part of the light passing through the diffuser element 24 impinges on the reflector element 31, as illustrated in an exemplary manner by the arrow of light a'. Other light components, as illustrated by arrows c' and b', pass through the diffuser element 24 and leave the light fixture 10 through the light opening 32 of the light fixture 10 without impinging on one of the reflector elements 31 or 33.

As also illustrated by means of FIG. 7, there is the option of using the trough-shaped reflector element 16 in varying light fixtures that have varying secondary reflector elements 31. For example, one can fall back on a compact unit according to FIG. 2 of an identical or comparable shape that has the varying secondary reflector elements 31 in different light fixtures 10. This enables the creation of a modular style of light fixtures.

The invention claimed is:

1. A light fixture for fixing to a building or building surface, the fixture comprising:
    a trough-shaped reflector having first and second side walls confronting each other and forming a light outlet and a reflective inner surface, each of the side walls having a planar section;
    a diffuser on the outlet;
    a printed-circuit board fixed to an outside face of the section of one of the side walls;
    screws and/or detents securing the board to the section; and
    a plurality of LED's of different colors on the planar sections and positioned such that a predominant portion of the light emitted by the LED's on the one side wall only reaches the diffuser element after reflection off the other side wall, the LED's of the one side wall being carried by the board.

2. A light fixture for fixing to a building or building surface, the fixture comprising:
    a trough-shaped reflector having first and second side walls confronting each other and forming a light outlet and a reflective inner surface, each of the side walls having a planar section;
    a diffuser on the outlet;
    a printed-circuit board fixed to an outside face of the section of one of the side walls;
    a plurality of LED's of different colors on the planar sections and positioned such that a predominant portion of the light emitted by the LED's on the one side wall only reaches the diffuser element after reflection off the other side wall, the LED's of the one side wall being carried by the board; and
    a heat sink on an outside face of the printed-circuit board.

3. A light fixture for fixing to a building or building surface, the fixture comprising
    a trough-shaped reflector having first and second side walls confronting each other and forming a light outlet and a reflective inner surface, each of the side walls having a planar section;
    a diffuser on the outlet;
    a plurality of LED's of different colors on the planar sections and positioned such that a predominant portion of the light emitted by the LED's on one of the side walls only reaches the diffuser element after reflection off the other side wall; and
    a second reflector element in a path of light emitted by and reflected from the LED's outside the light outlet of the reflector.

4. A light fixture as defined in claim 3, wherein the second reflector element is designed in the form of a curved light diffuser.

5. A light fixture as defined in claim 3, wherein only a portion of the light passing through the diffuser element impinges on the second reflector element.

6. A light fixture for fixing to a building or building surface, the fixture comprising:
    a trough-shaped reflector having first and second side walls forming a light outlet and a reflective inner surface, each of the side walls having a planar section with the planar sections confronting each other and diverging from each other toward the outlet;
    a diffuser on the outlet; and
    a plurality of LED's of different colors on the planar sections and positioned such that a predominant portion of the light emitted by the LED's on one of the side walls only reaches the diffuser element after reflection off the other side wall.

7. A light fixture as defined in claim 6, wherein a printed-circuit board that carries several LED's is fixed on an outside face of the section.

8. A light fixture as defined in claim 7 wherein the LED's project from the printed-circuit board into the interior of the reflector.

9. A light fixture as defined in claims 7 wherein openings are provided in the one section.

10. A light fixture as defined in claim 9, wherein the LED's at least in part project through the openings.

11. A light fixture as defined in claim 7 wherein at least one printed-circuit board is provided on which at least six LED's are spaced apart from one another.

12. A light fixture as defined in claim 11, wherein at least one printed-circuit board is provided on which at least two red, two blue, and two green LED's are spaced apart from one another.

13. A light fixture as defined in claim 6 wherein the reflector has four side walls.

14. A light fixture as defined in claim 13, wherein the first and the second side wall, especially the four side walls, extend along a plane.

15. A light fixture as defined in claim 6 wherein the reflector has a floor.

16. A light fixture as defined in claim 6 wherein the reflector consists of at least five components that are interconnected.

17. A light fixture as defined in claim 6 wherein the LED's are controllable for realizing a changeable mixing color of the light fixture individually or as a group.

18. A light fixture as defined in claim 6 wherein the trough-shaped reflector has a generally trapezoidal cross-section.

19. A light fixture as defined in claim 6 wherein the reflector element has a generally triangular cross-section.

20. A light fixture as defined in claim 6 wherein the reflector element has a generally rectangular cross-section.

21. A light fixture as defined in claim 6 wherein the light outlet is generally rectangular.

* * * * *